No. 773,670. PATENTED NOV. 1, 1904.
L. F. W. PAHL.
SPEED INDICATOR.
APPLICATION FILED JULY 21, 1904.
NO MODEL. 2 SHEETS—SHEET 2.
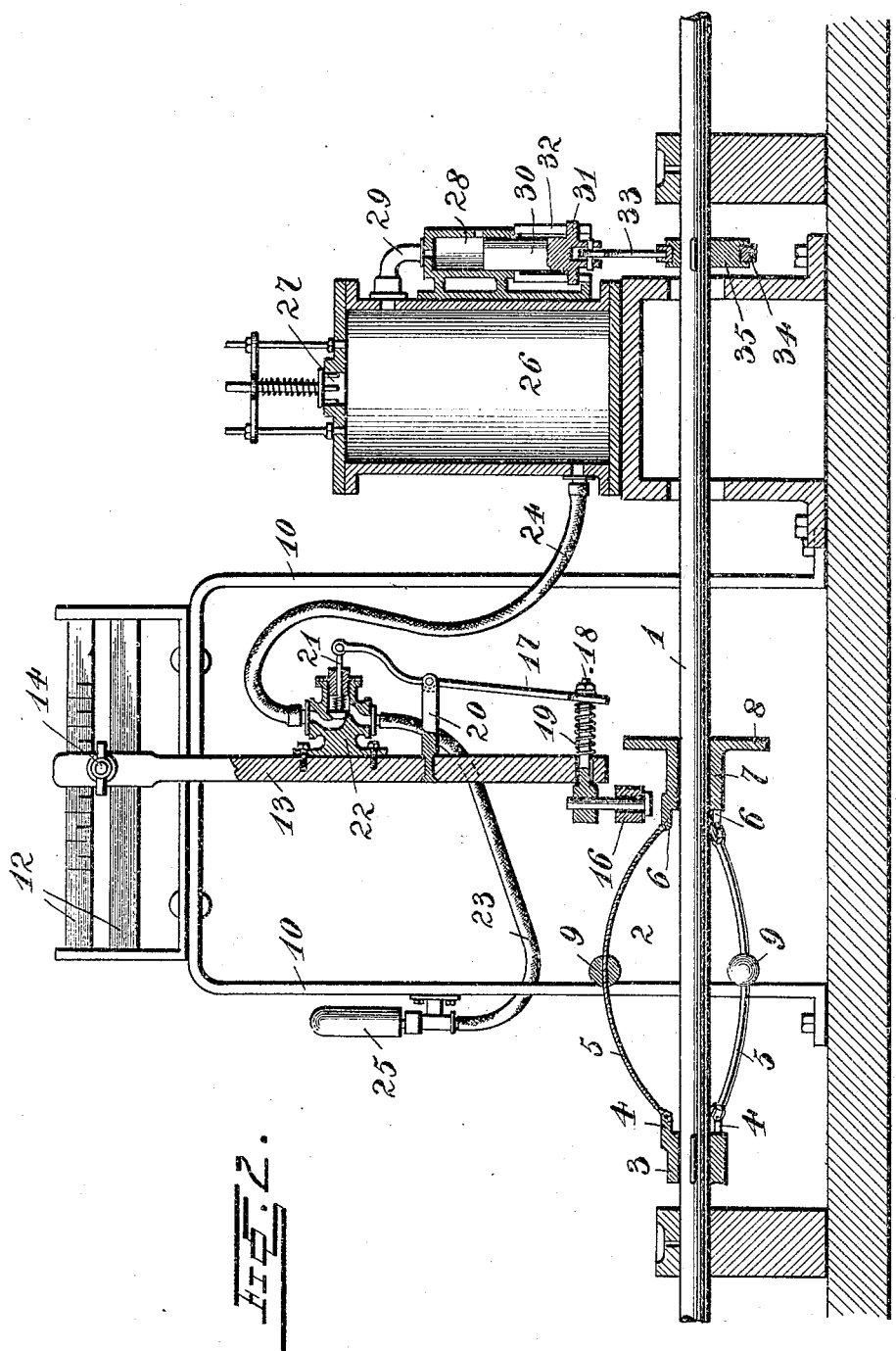
Witnesses
C. Munter
P. H. Griesbauer
Inventor
L. F. W. Pahl
by H. B. Willson
Attorney No. 773,670.

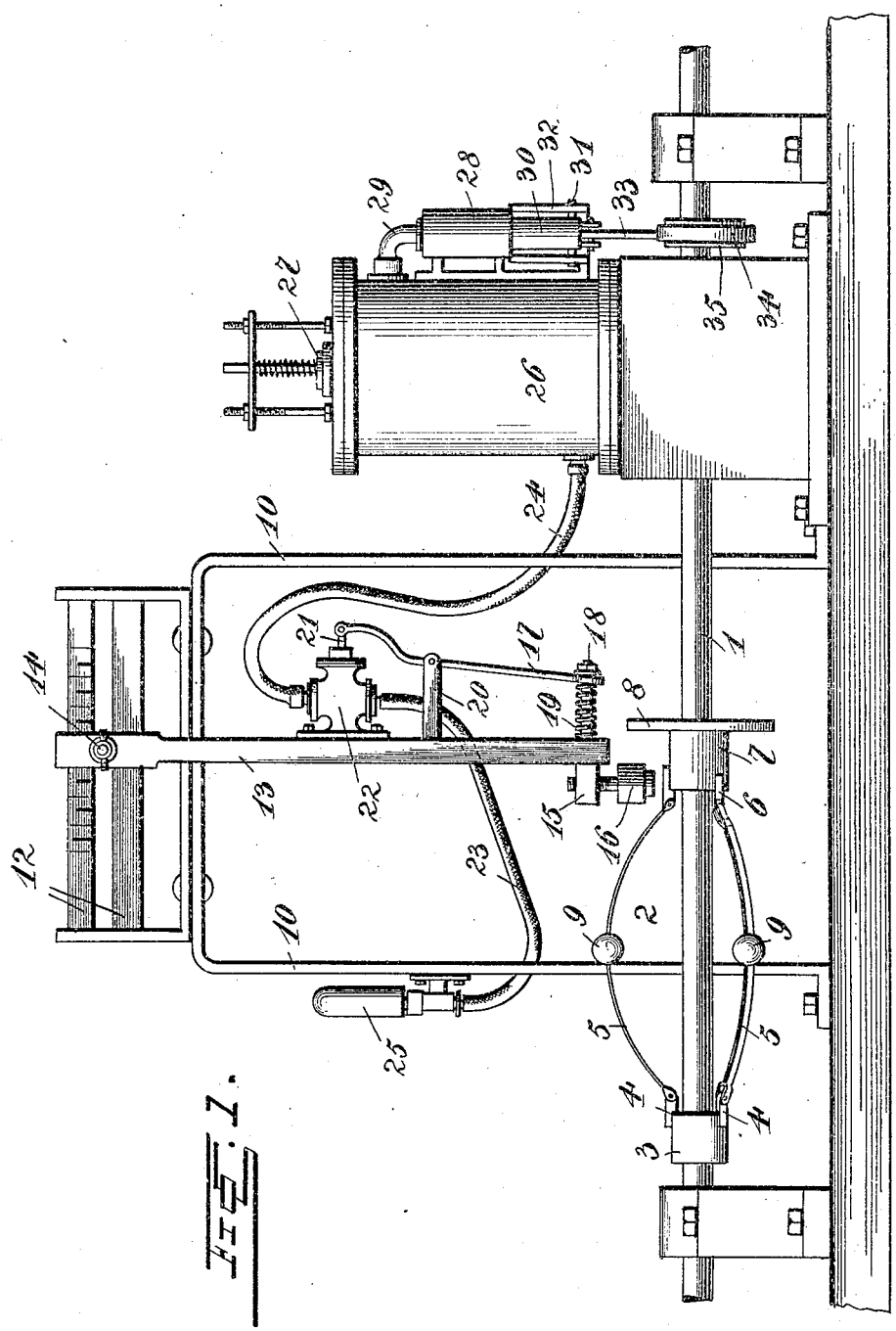

Patented November 1, 1904.

UNITED STATES PATENT OFFICE.

LEOPOLD FRIDRICH WILLIAM PAHL, OF WASHINGTON, DISTRICT OF COLUMBIA, ASSIGNOR OF ONE-HALF TO H. E. SCHERRER, OF WASHINGTON, DISTRICT OF COLUMBIA.

SPEED-INDICATOR.

SPECIFICATION forming part of Letters Patent No. 773,670, dated November 1, 1904.

Application filed July 21, 1904. Serial No. 217,526. (No model.)

*To all whom it may concern:*

Be it known that I, LEOPOLD FRIDRICH WILLIAM PAHL, a citizen of the United States, residing at Washington, in the District of Columbia, have invented certain new and useful Improvements in Speed-Indicators; and I do declare the following to be a full, clear, and exact description of the invention, such as will enable others skilled in the art to which it appertains to make and use the same.

This invention relates to improvements in speed-indicators for revolving shafts.

The object of the invention is to provide an indicating device by which the speed of a revolving shaft may be indicated.

Another object is to provide a device of this character to be used in connection with a revolving shaft, whereby when the speed of the shaft has reached a predetermined point an alarm will be sounded, thereby attracting the attention of the attendant, means being also provided whereby the alarm-actuating mechanism may be adjusted to cause said alarm to be sounded when the shaft has reached any desired rate of speed.

With these and other objects in view the invention consists of certain novel features of construction, combination, and arrangement of parts, as will be hereinafter more fully described, and particularly pointed out in the appended claims.

In the accompanying drawings, Figure 1 is a diagrammatic view of a portion of the shaft and its supporting-frame, showing the application of the invention; and Fig. 2 is a vertical sectional view of the same.

Referring more particularly to the drawings, 1 denotes the drive-shaft of the machine and to which is connected a governor 2, which may be of any suitable construction, but which is here shown as a centrifugal governor and consists of a sleeve or collar 3, secured to said shaft 1 to rotate therewith. On one end of said collar 3 are secured lugs 4, to which are hinged the pivotally-connected outer ends of spring-metal governor arms or bars 5. The opposite ends of said collar are hinged or pivotally connected to lugs 6, secured to the inner end of a sliding collar 7. Said collar is provided on its outer end with an annular flange 8. Midway between the ends of the governor arms or bars 5 are secured weights 9, which are here shown in the form of balls or spheres. Secured to a suitable portion of the frame of the machine are posts 10, to which are secured the ends of parallel gage-bars 12, on one or both of which is arranged a graduated scale. Adjustably secured to the gage-bars 12 is an arm or bar 13, one end of which lies adjacent to the flanged collar 7. The opposite end of the arm or bar 13 may be adjustably secured to the bars 12 in any suitable manner, but is here shown as clamped to the same by means of a headed bolt or set-screw 14, the head of which is adapted to engage one side of the bars 12, while the stem of the same is adapted to pass between said bars 12 and through the arm or bar 13 and to receive upon its threaded end a winged nut. Said nut when screwed up against said arm or bar will firmly clamp the same against the bars 12, thereby holding said arm in its adjusted position.

In the lower end of the arm or bar 13 is formed a slot or passage, through which projects a trip-bar 15, on one end of which is formed a head, to which is connected a friction-roller 16. Said roller 16 is adapted to lie in the path of movement of the flange-collar 7. The opposite end of the trip-bar 15 is threaded and projects through the lower end of a pivoted arm or lever 17. On the outer end of the trip-bar 15 is adapted to be screwed a nut 18, whereby the lower end of the lever 17 may be adjustably connected to the said trip-bar. On the trip-bar 15, between the lower end of the lever 17 and the end of the arm or bar 13, is arranged a coil-spring 19, which normally holds the head of the trip-bar 15 in engagement with the bar 13.

The lever 17 is pivotally connected at its upper end to a bracket 20, which projects from the side of the bar 13, and to the upper end of said lever is connected the end of a valve-stem 21, which is adapted to open and close a valve 22, which is mounted on the arm or bar 13 or connected to any other suitable support. To the casing of the valve 22 is connected flexible pipes 23 and 24. The pipe 23 extends to and is connected with a whistle or other sounding alarm 25, which is disposed at a suitable point within hearing of the attendant. The pipe 24 extends to and is connected with a compressed-air tank 26, which may be located on and is secured to the frame of the machine at any suitable point. The air-tank 26 is provided with a suitable blow-off or relief valve 27, whereby should the pressure of air be too great in said tank the same will be permitted to escape.

Secured to the side of the air-tank 26 or to an adjacent part of the machine-frame is an air-pump 28, which is connected by a pipe 29 to compressed-air tank 26. The pump 28 may be of any suitable construction, but is here shown as consisting of a cylinder having a solid reciprocating piston 30 and the outer end of which has a cross-head 31, the ends of which are slidably mounted in guideways 32, and has pivotally connected thereto the end of a piston-rod 33, the opposite end of which is connected to an eccentric-strap 34, which is engaged with a cam or eccentric 35, fixed on the shaft 1 of the machine, whereby when said shaft is revolved said piston will be reciprocated, thereby pumping air into the tank 26.

In operation the arm or bar 13 is adjusted upon the gage-bars 12 to the scale-mark representing the limit of speed to which it is desired that the shaft 1 should be revolved. The machine now being in operation, the shaft will be revolved thereby. Should the speed of the shaft be increased to such an extent as to cause the governor-arms 5 to fly outwardly far enough to draw the flange 8 on the collar 7 into engagement with the friction-roller 16 on the trip-bar 15 and to slide said trip-bar through the slot in the end of the arm or bar 13, said trip-bar will rock the lever 17, thereby causing the opposite ends of the same to open the valve 22, thus permitting compressed air from the tank 26 to pass through the pipes 23 and 24 and into the whistle 25, thereby blowing the same and sounding an alarm, by which the attendant may know the shaft has reached the limit of the speed at which the same should revolve, so that he may reduce the speed of the engine.

A speed-indicating device such as herein shown and described is particularly adapted for use in connection with motor-vehicles, thereby obviating the necessity of close observation of the speedometer. The device may be used, however, in connection with the shaft or other revolving part of any machine to indicate to the attendant when the speed of such machine has reached the rate at which it is desired said machine should rock.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a speed-indicating device for machines, the combination with a fluid-pressure tank, of an alarm adapted to be sounded by the action of the fluid flowing from said tank, and means actuated by a moving part of said machine for admitting fluid from said tank to said alarm, substantially as described.

2. In a speed-indicating device for revolving shafts, the combination with a compressed-air tank, of means actuated by said shaft for forcing air into said tank, an alarm adapted to be sounded by the action of the air flowing from said tank, and means actuated by the revolution of said shaft for admitting air from said tank to said alarm, when said shaft has reached the desired rate of speed, substantially as described.

3. In a speed-indicating device for revolving shafts, the combination with a fluid-pressure tank, of an alarm adapted to be sounded by the action of the fluid flowing from said tank, controlling mechanism whereby the fluid in said tank is admitted to and cut off from said alarm, means whereby said controlling mechanism is actuated by the revolutions of said shaft when the same has reached a predetermined rate of speed, substantially as described.

4. In a speed-indicating device for revolving shafts, the combination with a fluid-pressure tank, of an alarm adapted to be sounded by the action of the fluid flowing from said tank, a valve whereby the admission of fluid from said tank to said alarm is controlled, a lever connected to the stem of said valve, and means actuated by the revolutions of said shaft, to trip said lever when said shaft has reached a predetermined rate of speed, substantially as described.

5. In a speed-indicating device for revolving shafts, the combination with a fluid-pressure tank, of an alarm adapted to be sounded by the action of the fluid flowing from said tank, a valve whereby the admission of fluid from said tank to said alarm is controlled, a lever connected to the stem of said valve, a trip-bar connected to the lower end of said lever and adapted to be actuated by the governor of said shaft when the latter has reached a predetermined rate of speed, substantially as described.

6. In a speed-indicating device for revolving shafts, the combination with a fluid-pressure tank, of an alarm adapted to be sounded by the action of the fluid flowing from said tank, a valve whereby the admission of fluid from said tank to said alarm is controlled, an adjustably-mounted arm, valve-pipes connecting said valve with said tank and with said alarm, a lever pivotally mounted on said arm one end of said lever being connected to the stem of said valve, a spring-retracted trip-bar slidably mounted in the opposite end of said arm, one end of said bar being pivotally connected to said lever and the opposite end being in position to be engaged by the governor of said shaft when the latter has reached a predetermined rate of speed, substantially as described.

7. In a speed-indicating device for revolving shafts, the combination with a fluid-pressure tank, of an alarm adapted to be sounded by the action of the fluid flowing from said tank, a valve whereby the admission of fluid from said tank to said alarm is controlled, gage-bars secured to the frame of said shaft, an arm adjustably connected to said gage-bars, a valve carried by said arm, pipes connecting said valve with said tank and with said alarm, a lever pivotally mounted on said arm one end of said lever being connected to the stem of said valve, a spring-retracted trip-bar slidably mounted in the end of said arm one end of said bar being pivotally connected to the opposite end of said lever, a friction-roller carried by the opposite end of said trip-bar in position to be engaged and tripped by the governor of said shaft when the latter has reached or exceeds a rate of speed as determined and indicated by the position of the adjustable arm on said gage-bars, substantially as described.

In testimony whereof I have hereunto set my hand in presence of two subscribing witnesses.

LEOPOLD FRIDRICH WILLIAM PAHL.

Witnesses:
CHAS. G. SCHERRER,
HERBERT H. GAMBLE.